June 30, 1931.  E. P. BULLARD, JR  1,811,876
VERTICAL SPINDLE MACHINE TOOL
Filed July 8, 1925  6 Sheets-Sheet 2

INVENTOR.
Edward P. Bullard, Jr.
BY
Chamberlain & Newman
ATTORNEYS.

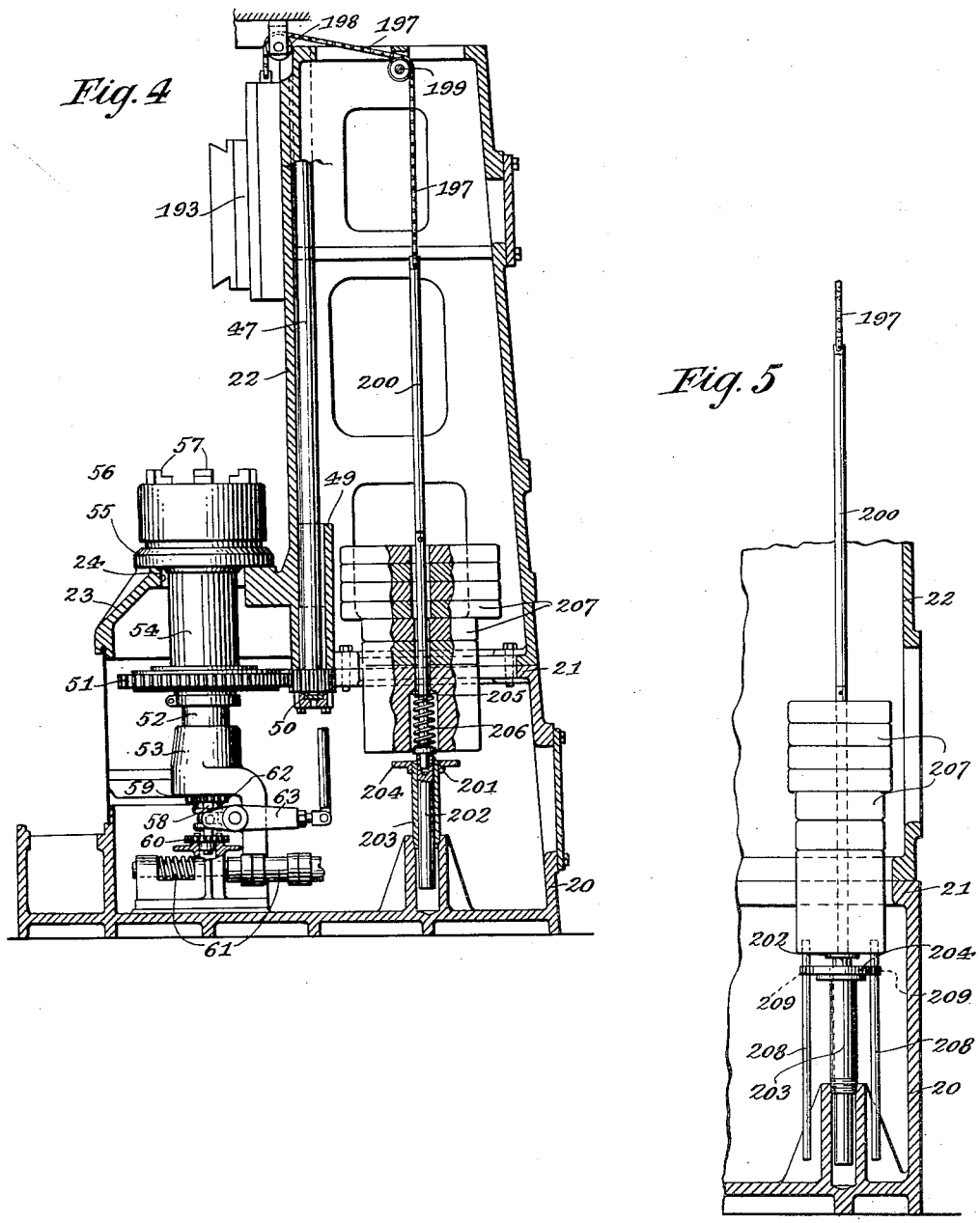

June 30, 1931.    E. P. BULLARD, JR    1,811,876
VERTICAL SPINDLE MACHINE TOOL
Filed July 8, 1925    6 Sheets-Sheet 4

INVENTOR.
Edward P. Bullard, Jr.
BY
Chamberlain & Newman
ATTORNEYS.

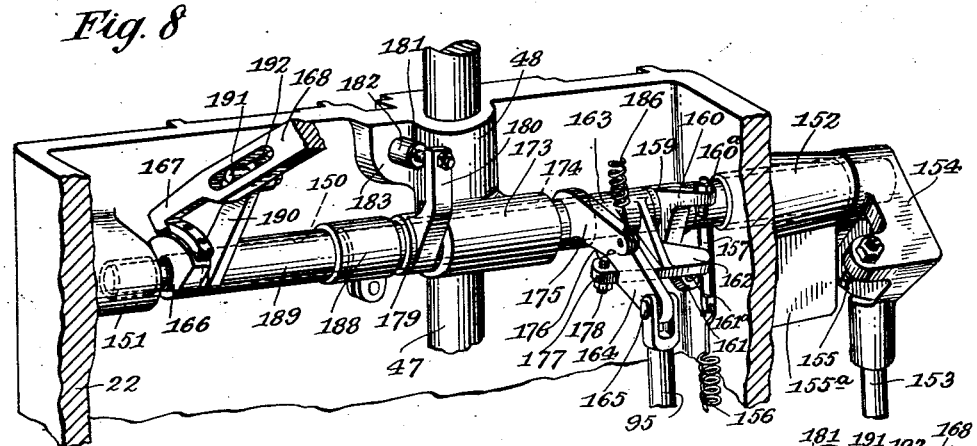

June 30, 1931.  E. P. BULLARD, JR  1,811,876
VERTICAL SPINDLE MACHINE TOOL
Filed July 8, 1925   6 Sheets-Sheet 6
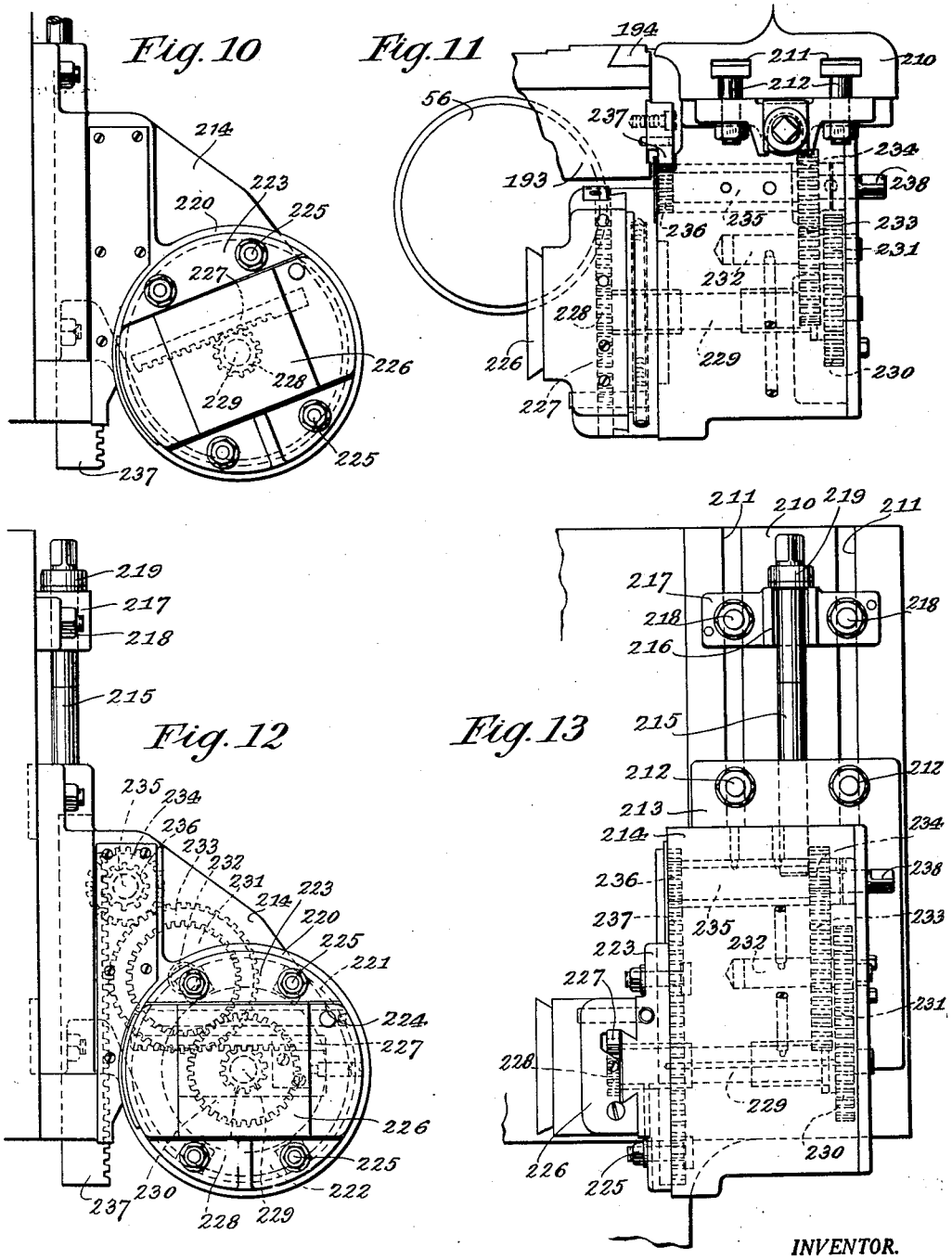
INVENTOR.
Edward P. Bullard, Jr.
BY
Chamberlain & Newman
ATTORNEYS.

Patented June 30, 1931

1,811,876

UNITED STATES PATENT OFFICE

EDWARD P. BULLARD, JR., OF STRATFORD, CONNECTICUT, ASSIGNOR, BY MESNE ASSIGNMENTS, TO THE BULLARD COMPANY, OF BRIDGEPORT, CONNECTICUT, A CORPORATION OF CONNECTICUT

VERTICAL SPINDLE MACHINE TOOL

Application filed July 8, 1925. Serial No. 42,186.

The present invention relates to an improved single spindle machine tool, and particularly such a machine tool of semi-automatic nature, the same being adapted in the present embodiment to be manually started, thereupon automatically operated through a single cycle, and automatically stopped at the completion of such cycle.

An object of the invention is to provide such a machine adapted to perform various machining operations upon work mounted upon a rotating spindle, and including tool carrying slides adapted for both vertical and transverse reciprocatory movements.

A further object is to provide means whereby such slides may be operated from a single feed works mechanism in a manner to produce desired variations in the extents of the movements of the respective vertical and transverse slides and in their relative speeds.

A still further object is to provide an improved control mechanism for manually starting and automatically stopping the machine, and further to provide means whereby the machine may be manually stopped at any desired point in the work cycle.

With the above and other objects in view an embodiment of the invention is shown in the accompanying drawings and this embodiment will be hereinafter more fully described with reference thereto and the invention will be finally pointed out in the claims.

In the drawings:—

Fig. 4 is a vertical sectional view of the machine, with the superstructure removed, and showing the counterbalance means for the tool slides;

Fig. 5 is another vertical sectional and fragmentary view at right angles to Fig. 4, and also showing the counterbalance means;

Fig. 8 is a perspective view, showing the start and stop control mechanism;

Fig. 9 is a vertical sectional end elevation view of the parts shown in Fig. 8, and also showing the drive shaft and clutch mechanism;

Figure 1:
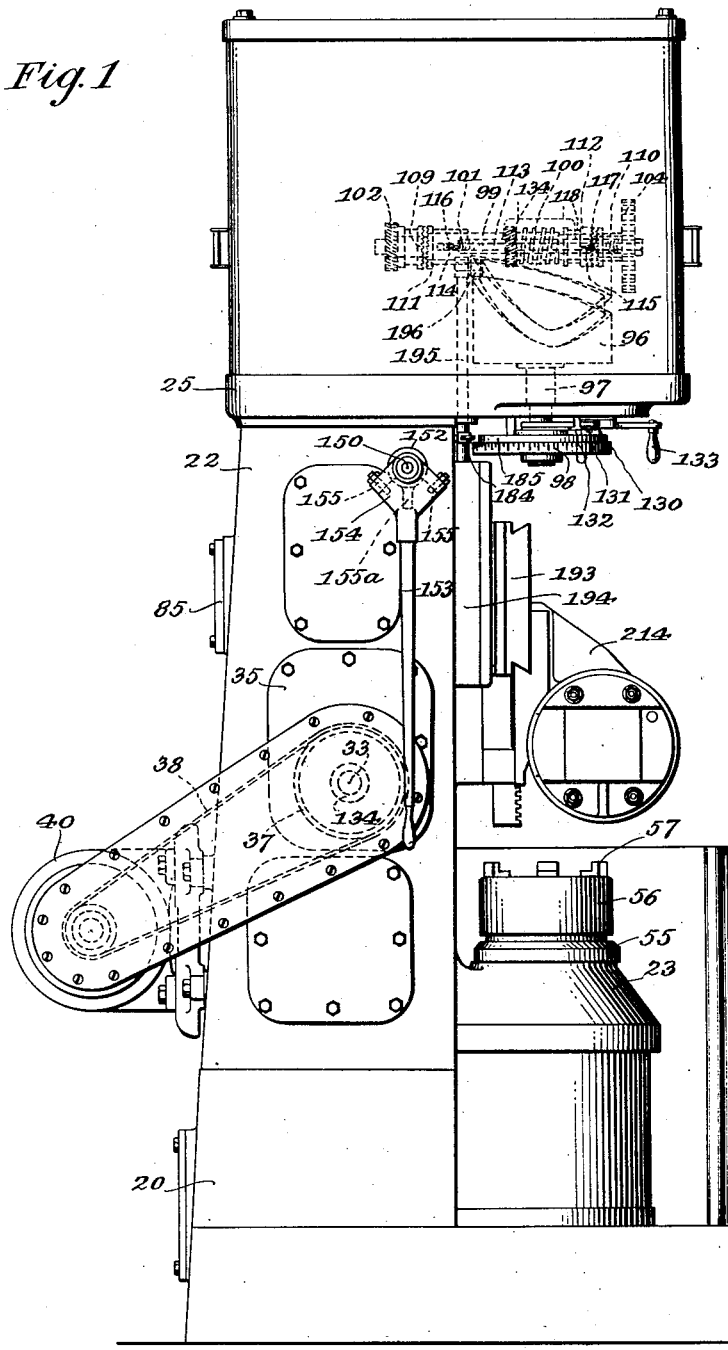
Fig. 1 is a side elevation of a single spindle machine tool, according to the present embodiment of the invention.

Fig. 9ª is a fragmentary view of the start and stop mechanism and showing the same in its position during operation of the machine;

Fig. 10 is an inner side view of the tool slide means, showing the transverse slide in an angular position of adjustment;

Fig. 11 is a plan view thereof;

Fig. 12 is another inner side view, and showing the transverse slide in a horizontal position of adjustment; and Fig. 13 is a front elevation of the transverse slide means.

Similar reference characters indicate corresponding parts throughout the several figures of the drawings.

Referring to the drawings, the frame of the machine consists of a base 20 provided at its upper edge with a flanged ledge 21, upon which is bolted the lower end of a vertically disposed hollow column 22 provided at its lower end and forward side with a work spindle supporting table 23 having a spindle receiving opening 24 therein. At the upper end of the column 22 there is bolted the base 25 of a feed works mechanism supporting superstructure, the forward portion of which projects with respect to the column 22 and overhangs the work spindle supporting table 23.

The machine is designed to be operated from a single vertical shaft 26 disposed within the column 22 and journaled at its lower end in a bearing 27, the upper end of the shaft being rotatable within a driving sleeve 28 journaled in a bearing 29 formed upon the base 25 of the superstructure, and which sleeve is adapted to be connected and disconnected with relation to the shaft 26 by means of a clutch mechanism 30 hereinafter more fully described. Upon the lower end of the shaft 26 there is secured a beveled gear 31 which meshes with a beveled gear 32 mounted upon a shaft 33 journaled in a suitable bearing portion 34 of a plate 35 bolted to the side of the column in covering relation to an opening 36 of the column. Upon this shaft there is provided a pulley 37 which is driven by a belt 38 from a pulley 39 provided upon the motor shaft of an electric motor 40 bolted to the rear face of the column 22.

During the operation of the machine the electric motor is continuously driven and through it the shaft 26, the mechanism of the machine being connected and disconnected to the shaft by means of the clutch mechanism above referred to.

Upon the upper end of the drive sleeve 28 there is provided a pinion 41 which meshes with a gear 42 provided upon the lower end of the vertical shaft 43 journaled in the frame 44 of the feed works mechanism, said shaft being provided at its upper end with a gear 45 which meshes with a gear 46 provided upon the upper end of a spindle drive shaft 47 which extends downwardly through the feed works mechanism and through the column 22, being supported intermediate its ends in a bearing portion 48 formed at the inner side of the column adjacent its upper end, and being supported at its lower end in a bearing portion 49 formed at the lower end of the column. The shaft 47 is provided at its lower end with a pinion 50 which meshes with a large gear 51 provided upon the work carrying spindle 52 which is supported at its lower end in a bearing 53 and extends at its upper portion through the upper spindle bearing 54 disposed in the opening 24 of the table 23 and provided with a flange 55 supported upon said table, the spindle being provided at its upper end with a work support or head 56 provided with chuck jaws 57. These chuck jaws are adapted to be automatically operated to opened and closed positions by mechanism similar to that disclosed in co-pending application Serial Number 7,896 and which mechanism includes a shaft 58 extending centrally through the spindle and which is adapted to be rotated in opposite directions to either open or close the chucks. For this purpose gears 59 and 60 are provided upon the shaft and are adapted to be continuously rotated in opposite directions through suitable gearing from a drive shaft 61, a clutch 62 operable by means of a lever 63 being adapted to be moved into relation with one or the other of the gears 59 and 60 to thereby cause the chuck to be operated into open or closed positions. The shaft 61 is adapted to be continuously driven during the operation of the machine, and for this purpose it is provided at its inner end with a beveled gear 64 which meshes with a beveled gear 65 provided upon the lower end of a vertical shaft 66 which is connected to the drive shaft 26 by means of an intermediate shaft 67 coupled at its respective ends to the ends of the shafts 26 and 66. A frame structure 68 having suitable journal bearings for the shafts 61 and 66 is provided within the base 20.

The shaft 66 also carries gears 69 and 70 which drive the gears 71 and 72 of oil pumps 73 and 74 respectively provided for the lubricating and the cutting oils, and which oils are conducted to the desired parts of the machine by suitable piping.

Figure 3:
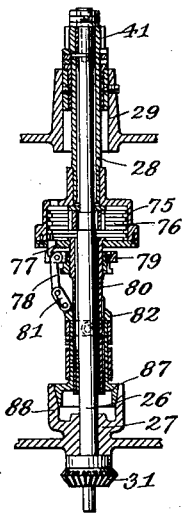
Fig. 3 is a vertical sectional detail view of the drive shaft and clutch mechanism employed.
Figure 6:
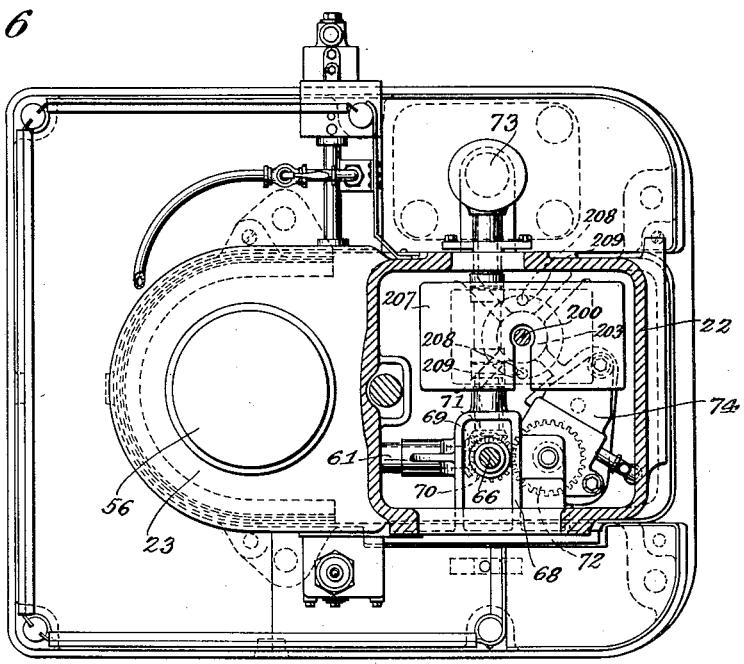
Fig. 6 is a horizontal sectional view, taken along the line 6—6 of Fig. 2.
Figure 7:
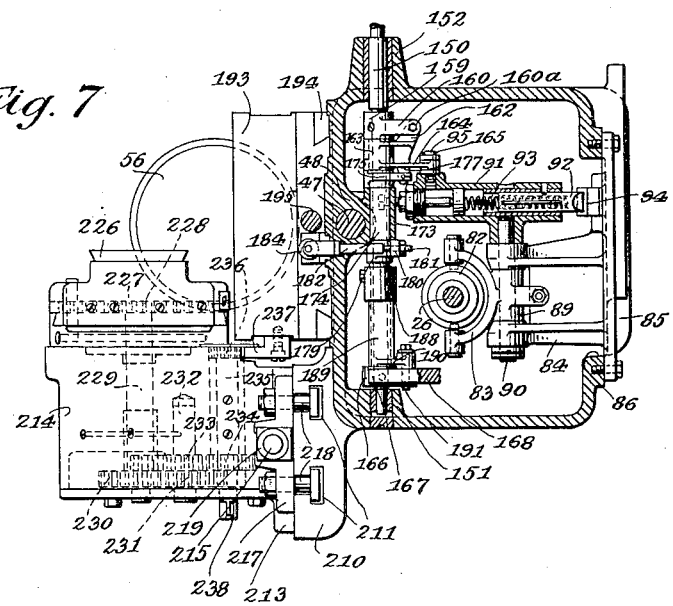
Fig. 7 is a horizontal sectional view, taken along the line 7—7 of Fig. 2.

The clutch mechanism (Fig. 3) for connecting the shaft 26 to the driving sleeve 28 consists of a clutch housing 75 secured upon the sleeve 28 and within which there are provided a series of superimposed clutch discs 76, alternate ones of which are connected to the clutch housing while the others are connected to the shaft 26, and in the base of the clutch housing there are provided plungers 77 adapted when pressed inwardly to press the clutch discs together to thereby connect the sleeve to the shaft, and when moved outwardly to release the driving connection between them. For the purpose of raising these plungers there are provided a series of levers 78 mounted upon a collar 79 secured upon a sleeve 80 extending downwardly from the clutch housing about the shaft 26, said levers being provided with shoulders which abut the plungers in a manner to raise and lower them upon rotary movement of the same, the levers being connected at their lower ends by means of links 81 to a sliding collar 82 mounted upon the sleeve 80. The collar 82 is provided with an annular channel in which are engaged the rollered ends of a yoke lever 83 pivotally mounted in a bracket 84 secured upon a plate 85 bolted upon the rear face of the column 22 in covering relation to an opening 86 therein. Upon rotation of the yoke lever 83 in one or the other directions the clutch is adapted to be engaged or disengaged, and in the disengaged position the collar 82 is moved downwardly and engages a cone-shaped brake portion 87 secured upon its lower end with a brake seating portion 88 formed upon the bearing 27, to thereby cause the driving sleeve to be immediately stopped when the clutch is disengaged.

The pivotal mounting for the yoke 83 consists in clamping its hub portion 89 about a shaft 90 journaled in the two arms of the bracket 84, and upon the projecting end of this shaft there is secured a plunger lever 91 of tubular form provided with an arrow pointed plunger 92 pressed outwardly at one end by means of a spring 93 into engagement with a V-shaped block 94, the lever being pivotally connected at its other end to the lower end of a link 95 connected at its upper end to the mechanism, presently to be described, for effecting the manual starting and stopping and the automatic stopping of the machine.

In starting the machine it will be understood that the link 95 is pulled upwardly thereby rotating the plunger lever of the yoke 83 in clockwise direction to a position where the arrow point of the plunger passes over the point of the V-block 94 thereby raising the collar 82 to cause the clutch to be engaged and the brake 87 to be disengaged. Downward movement applied to the link 95 causes the plunger lever to be rotated in counter-clockwise direction, and whereby the clutch is disengaged and the brake engaged to stop the machine.

The feed works mechanism includes a cam drum 96 journaled in the feed works frame for rotation about a vertical axis and provided at the lower end of its supporting shaft 97 with a cam carrying control dial 98 for automatically changing the speed of the tool slide and stopping the machine at the completion of a single cycle. At one side of the drum there is provided a transverse shaft 99 provided with a worm 100 meshing with a worm gear 101 secured to the drum, and at one end of said shaft there is rotatably mounted a spiral gear 102 meshing with a spiral gear 103 provided upon the shaft 43. At the other end of the shaft 99 there is rotatably mounted a gear 104, which meshes with a gear 105 provided on one end of a shaft 106 journaled in the frame 44 and provided at its other end with a worm gear 107 meshing with a worm 108 provided upon the shaft 47. The gears 102 and 104 are thus adapted to be driven at relatively fast and slow speeds, and by being respectively connected to the worm shaft 99 are adapted to rotate the cam drum at relatively fast and slow speeds, and thereby impart such relatively fast and slow reciprocatory movement to the tool slides, operated by the drum, as will hereinafter more fully appear. For the purpose of connecting said gears 102 and 104 toothed clutch extensions 109 and 110 are provided respectively thereon, and in adjacent relation to these extensions toothed clutch collars 111 and 112 are slidably mounted on the shaft, being connected together by means of an axial slide rod 113 slidable in a central bore of the shaft 99 and provided at its ends with cross pins 114 and 115 connected to the collars through slots 116 and 117 in the shaft 99, so that as one collar is shifted into mesh with its clutch extension the other collar is shifted out of mesh with its clutch extension.

Figure 2:
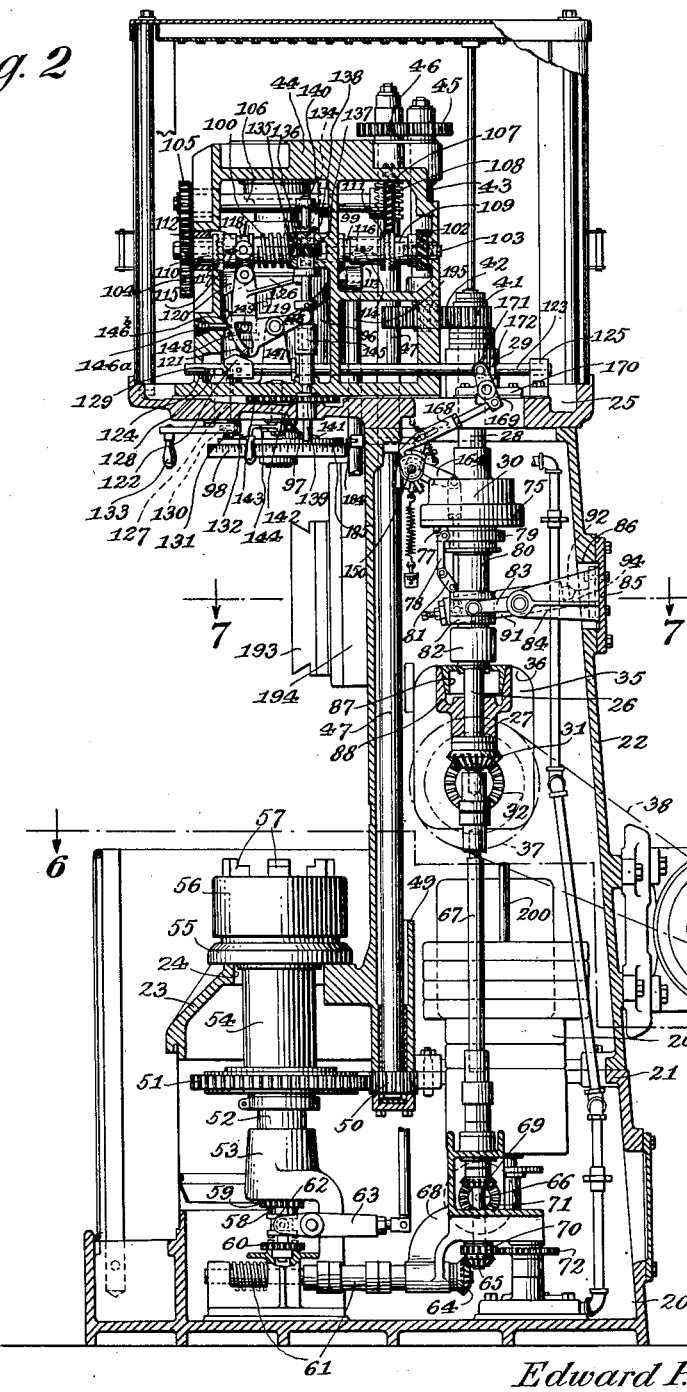
Fig. 2 is a vertical sectional view thereof.

The collar 112 is provided with an annular groove 118 which is engaged by the upper rollered forked end of a shift lever 119 pivotally mounted upon a bracket 120 of the frame, and provided at its lower end with a spring pressed roller-ended plunger 121 engaging a V-block 122 provided on a slide rod 123 guided for horizontal sliding movement in suitable bearings 124 and 125. Upon reciprocation of the rod 123 in one direction (to the right Fig. 2), the shift lever is swung to mesh the collar 112 with its clutch extension, while reciprocation in the other direction disengages this collar and engages the collar 111 with its clutch extension, this change occurring in the operation of the machine at the completion of the down or cutting movement of the tool slides to effect a relatively rapid return movement. The movement of the lever 119 is limited in one direction by means of an arm 126 which abuts a suitable stop on the frame 44 and in the other direction by abutment of the lever with the side of said frame.

The rod 123 is adapted, upon starting the machine, to be reciprocated in one direction (to the right Fig. 2) to mesh the clutch collar 112 by manual starting means hereinafter more fully described, and in the other direction by cam means carried upon the cam dial 98, and so timed that this latter action occurs at the end of the down stroke of the tool slides. To this end a vertical rock lever 127 is journaled in the base of the feed works and is provided at its upper end with a lever arm 128 engaged in a cut-out 129 of the rod, while at its lower end there is provided a lever arm 130 provided with a pin 131 disposed in the path of a cam 132 provided upon the cam dial 98, and adapted upon engagement therewith to rock the shaft 127 to thereby shift the rod. The rock shaft is further provided with a crank 133 for manual shifting of the rod when desired.

In order to effect manual rotation of the cam drum and consequent adjustment of the position of the tool slides, the worm shaft 99 is provided with a spiral gear 134 which meshes with a spiral gear 135 having its tubular hub 136 journaled in a bearing portion 137 of the frame 44, said hub being provided at its upper end with a toothed clutch portion 138. Within the tubular hub 136 there is engaged a vertical slide rod 139 provided at its upper end with a toothed clutch collar 140, its lower end having bearing in the base of the feed works and provided at its projecting extremity with a handle 141. A gear 142 is keyed to the rod 139 between the base of the feed works frame 44 and the base 25 of the superstructure in a manner to permit relative vertical movement of said rod, and said gear meshes with another gear 143 having its shaft projected downwardly through the base 25 and provided with a crank handle 144.

It is obvious that by pulling the rod 139 downwardly the clutch collar 140 is connected to the clutch portion 138 of the spiral gear 135, and by manually turning the crank 144 rotary movement is imparted to the cam drum as desired. It is necessary during such manual operation of the drum that the two clutch collars 111 and 112 be in neutral position, and for this purpose an annularly channeled sleeve 145 is secured to the rod 139 and is engaged by the forked end of a neutralizing lever 146 pivotally mounted upon a standard 147, and provided at its other end with a triangular cam portion 148 engaging a pin 149 upon the shift lever 119, a spring pressed plunger 146ª engaging a recess 146ᵇ in the end of the lever 146 normally maintaining the same in its inoperative position, and also yieldably retaining the slide rod 139 in its raised or inoperative position. Upon moving the rod 119 to operative position, the neutralizing lever is swung upwardly at its cam end, thereby centralizing the position of the shift lever 119 and neutralizing the clutches 111 and 112, so that the worm shaft 99 is free of its driving gears.

The starting and stopping mechanism for the machine is mounted in the upper forward portion of the column 22 and comprises a horizontal shaft 150 rotatably mounted in bearings 151 and 152 in the sides of the column, one end of the shaft projecting with respect to the bearing 152 and being provided with a lever handle 153. At the upper end of the handle there is provided an angular flanged head 154 provided at each side with adjustable stop screws 155 adapted as the handle is swung in one of the other directions to engage a medial web portion 155ª formed at the under side of the bearing 152 to thereby limit such swinging movement, the handle being returned to its normal medial position upon release by means of a spring 156 tied between a depending stud 157 of the shaft 50 and a bracket 158 secured to the inner side of the column 22. Upon one end of the shaft 150 there is secured a collar 159 having spaced projecting arms 160 and 161 provided with adjustable contact screws 160ª and 161ª, respectively disposed above and below the projecting radial flange or web 162 of a collar 163 loosely mounted on the shaft 150 adjacent the collar 159. A lever arm 164 is also formed integrally with the collar 163 and is pivotally connected at 165 to the upper end of the link 95 of the clutch operating plunger lever 91.

There is also secured to the shaft 150 at the other end from the collar 159 a pawl or cam 166 engaged by the hook end 167 of a pull bar 168 pivotally connected at its other end to one end of a lever 169, rotatably supported in a bearing 170, and provided at its other end with a roller 171 engaging a collar 172 secured upon the rod 123 of the feed works mechanism.

Upon the inner side of the column 22 there is provided a bearing 173 surrounding the shaft 150 and in which a sleeve 174 is supported for relative rotary movement about the shaft, said sleeve projecting at each side of the bearing and being provided at one end with an arm 175 having a flattened contact portion 176 projecting above a flange 177 formed upon the side of the lever arm 164, an adjustable screw 178 being provided in said flange. Upon the other projecting end of the sleeve 174 there is secured a collar 179, provided with an upwardly extending arm 180 having an adjustable contact screw 181 in its end which engages the inner end of a horizontally disposed plunger rod 182 slidably mounted in a suitable bearing portion 183 of the column, and provided at its outer end with a roller 184 disposed in the path of a cam portion 185 provided upon the cam dial 98. The arm 180 is yieldably held in engagement with the plunger rod 182 and the latter normally pressed outwardly by means of a spring 186 secured between the arm 175 and an anchor pin 187.

There is also secured upon the projecting end of the sleeve 174 the split collar end 188 of a sleeve 189 provided, at its other end and adjacent the pawl 166, with an arm 190 provided at its end with a pin 191 slidably engaged in a slot 192 provided in the pull bar 168.

The operation of the start and stop mechanism is as follows:—

The machine is manually started with the parts in the position shown in Fig. 9 by swinging the lever 153 rearwardly (to the right, Fig. 8), which action rotates the collar 159 causing the lower contact screw 161ª to engage the web 162 and rotate the collar 163, thereby pulling the link 95 upwardly, and swinging the plunger lever 91, so that the arrow point 92 is moved from the upper inoperative position shown in Fig. 9 to the lower operative position shown in dotted lines, the point being just slightly past the point of the block 94 in this latter position. This action serves to engage the clutch plates 76 through the levers 78 and plungers 77, thereby starting the machine. Simultaneously with the rotation of the collar 163 the pawl 166 is rotated, drawing the pull bar 168 to the left (Fig. 9), and through the lever 169 shifting the rod 123 to the right, which engages the slow-speed down-feed clutch 111 of the feed works.

As the machine starts the dial 98 connected to the feed drum 96 is rotated, and through its cam portion 185 permits the plunger rod 182 to move outwardly, as shown in Fig. 9ª, the connected arms 175, 180 and 190 being thereby swung in an anti-clockwise direction under the action of the spring 186, the swinging of the arm 190 lifting the pull bar 168 so that it is out of operative relation with the pawl 166. The full lines, Fig. 9ª, show the pull bar in its raised inoperative position and shifted to the right through the shifting to the left of the rod 123, which latter action takes place at the completion of the down movement of the tool slides through the automatic operation of the lever 128 by the cam 132 of the dial 98, to engage the fast-speed return-feed clutch 112. It is obvious that with the pull bar 168 raised to its inoperative position (Fig. 9ᵃ) the machine may be manually stopped and re-started by swinging the lever 153 at any point in the down or up feed of the tool slides, without changing the setting of the feed works, the contact screw 160ᵃ stopping the machine by depressing the web 162 and the link 95, while the contact screw 161ᵃ starts the machine by raising these parts. It will be noted that the lost motion between the contact screw 160ᵃ and the web 162, in the operative position of the latter, allows a limited initial inoperative movement of the lever 153 in stopping direction, which prevents the machine from being stopped by mistake, or by the swinging of the lever, after starting and letting go of the handle.

As the tool slides reach the top of their return or up feed a rise on the cam 185 of the cam dial 98 presses the plunger rod 182 inwardly, rotating the arms 175, 180 and 190 in clockwise direction, the arm 175 engaging the contact screw 178 of the collar 163, depressing the link 95, and releasing the plunger lever 91 from the block 94, so that it moves to its inoperative clutch disengaging position under the action of its spring 93. At the same time the arm 190 moves the pull bar 168 into operative relation with the pawl 166, as shown in dotted lines in Fig. 9ᵃ, so that the machine is in position to be manually started for the next operative cycle.

Thus the machine is adapted to be manually started, and automatically stopped at the completion of a single cycle, the feed works are automatically controlled to feed the tool slides downwardly at relatively slow or working speed and upwardly at relatively fast or return speed, and at any time during the cycle the machine may be manually stopped and re-started without changing the setting of the feed works.

The tool carrying slide mechanism includes a vertical slide or tool head 193 mounted for vertical reciprocation in a slideway 194 provided on the front face of the column 22, the slide being provided at its upper side with an upwardly projecting rod 195 extending through a suitable opening in the base 25 of the superstructure and provided at its upper end with a roller 196 engaging the groove of the cam drum 96.

The tool slide is counter-weighted (Figs. 4 and 5), and for this purpose a chain 197 is connected to its upper end and extends over guide pulleys 198 and 199 within the column, where it is connected to a vertically disposed rod 200 having secured to its lower flanged end 201 an enlarged extension rod portion 202 slidable in a tubular guide standard or post 203 provided with a flanged upper end 204. Between the upper flanged end 201 of the rod and a sliding ring 205 thereon there is provided a weight cushioning spring 206, the weights 207, which are vertically slotted and engaged about the rod 200 resting on this spring supported ring 205, so that as the weights reach their lowered position any impact shock is absorbed. In order to prevent rotation of the weights downwardly extending guide rods 208 are secured to the lowermost one and slidably engage recesses 209 in the flange 204 of the standard 203.

The transverse tool slide or head is mounted at one side upon the front of the column 22 upon a projecting support 210 having a pair of vertically disposed spaced T-slots 211 therein in which there is secured for vertical adjustment by stud bolts 212 the base 213 of the tool slide frame 214. A vertically extending rod 215 is secured to the base 213 and is engaged in a vertical slot 216 of a transverse bracket 217 adjustably secured to the support 210 by means of stud bolts 218 engaging the slots 211, the rod being supported upon said bracket by means of a collar 219.

The frame 214 is of hollow construction and is provided at its inner side with a mounting plate portion 220 having arcuate slots 221 and 222 therein, and to this plate 220 there is secured a circular tool head support 223 having a slideway 224, and secured for rotary adjustment by means of bolts 225 engaged in the slots 221 and 222. On this slideway there is slidably mounted a tool supporting head 226 provided at its inner side and in spaced relation to the axis of the plate 220 with a longitudinally extending rack 227 meshing with a pinion 228 provided upon the forward end of a shaft 229 journaled in the frame 214 axially of the portion 220, and at the other end of the said shaft there is provided a gear 230 meshing with a gear 231 provided upon a shaft 232 journaled in the frame 214. Upon the shaft 232 there is provided a larger gear 233 which meshes with a gear 234 provided upon a shaft 235 journaled in the frame 214 and provided at its forward end with a gear 236 and with which a vertically disposed rack 237 meshes, this rack being secured at the side of the vertical tool slide and adapted as the tool slide is reciprocated to rotate the gear 236 and through the train of gearing impart reciprocatory movement to the tool head 226. The end of the shaft 235 is squared as at 238 and projects with respect to the frame 214 to permit engagement therewith of a hand crank for the purpose of manually adjusting the position of the tool head.

It will be noted from Figs. 10 and 12 that the driving pinion 228 engages the rack 227 in a manner to permit of rotary adjustment of the plate 223 to any desired position.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In a machine tool of the character described, the combination of a base, a rotary work carrying spindle mounted in said base, a column extending upwardly from said base at one side of said spindle, tool slide means mounted in said column, feed works mounted at the upper end of said column operatively connected with said tool slide means to move said means into and out of relation with said spindle, drive means for said spindle, drive means for driving said feed works and spindle drive comprising a continuously driven shaft vertically disposed in said column, an intermittent drive shaft in axial alignment with said continuously driven shaft and operatively connected to said feed works and spindle drive for simultaneously driving them, clutch means for connecting and disconnecting said intermittent drive shaft and said continuously driven shaft, manual means for connecting said clutch means, and automatic means adapted to be operated at the end of a single cycle of operation of said tool slide means for disconnecting said clutch means.

2. In a machine tool of the character described, the combination of a base, a rotary work carrying spindle mounted in said base, a column extending upwardly from said base at one side of said spindle, tool slide means mounted in said column, feed works mounted at the upper end of said column operatively connected with said tool slide means to move said means into and out of relation with said spindle, drive means for driving said feed works and spindle drive comprising a continuously driven shaft vertically disposed in said column, an intermittent drive shaft in axial alignment with said continuously driven shaft and operatively connected to said feed works and spindle drive for simultaneously driving them, longitudinally movable clutch means for connecting and disconnecting said intermittent drive shaft and said continuously driven shaft, longitudinally movable brake means for said intermittent drive operatively connected to said clutch means, whereby as the latter is disconnected the brake means is applied, and as it is connected the brake means is released, manual means for connecting said clutch means, and automatic means adapted to be operated at the end of a single cycle of operation of said tool slide means for disconnecting said clutch means.

3. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle, drive means for said spindle, continuous drive means, intermittent drive means for simultaneously driving said feed works and said spindle drive means, clutch means for connecting and disconnecting said intermittent drive means to said continuous drive means, manual means for connecting said clutch means, automatic means adapted to be operated at the end of a single cycle of operation of said tool slide means for disconnecting said clutch means, chuck means carried by said spindle, and continuously driven chuck operating means operatively connected to said continuous drive means.

4. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle, drive means for said spindle, continuous drive means, intermittent drive means for simultaneously driving said feed works and said spindle drive means, clutch means for connecting and disconnecting said intermittent drive means to said continuous drive means, manual means for connecting said clutch means, automatic means adapted to be operated at the end of a single operation of said tool slide means for disconnecting said clutch means and chuck means carried by said spindle.

5. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle and including slow and fast speed means whereby the working feed of said tool slide means is relatively slow and the return feed is relatively fast, drive means for said spindle, continuous drive means, intermittent drive means for simultaneously driving said feed works and said spindle drive means, clutch means for connecting and disconnecting said intermittent drive means to said continuous drive means, manual means for connecting said clutch means and simultaneously connecting said slow speed feed means of the feed works, automatic means for connecting said fast speed feed means of the feed works during the cycle of operation of the tool slide means, and automatic means adapted to be operated at the end of a single cycle of operation of said tool slide means for disconnecting said clutch means.

6. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle and including slow and fast speed means whereby the working feed of said tool slide means is relatively slow and the return feed is relatively fast, drive means for said spindle, continuous drive means, intermittent drive means for simultaneously driving said feed works and said spindle drive means, clutch means for connecting and disconnecting said intermittent drive means to said continuous drive means, manual start and stop means for connecting said clutch means and simultaneously connecting said slow speed feed means of the feed works, automatic means adapted upon starting of the machine to disconnect said manual start and stop means from said feed works whereby the machine may be manually stopped and restarted without changing the feed works, automatic means for connecting said fast speed feed means of the feed works during the cycle of operation of the tool slide means, and automatic means adapted to be operated at the end of a single cycle of operation of said tool slide means for disconnecting said clutch means.

7. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle and including slow and fast speed means whereby the working feed of said tool slide means is relatively slow and the return feed is relatively fast, drive means for said spindle, continuous drive means, intermittent drive means for simultaneously driving said feed works and said spindle drive means, clutch means for connecting and disconnecting said intermittent drive means to said continuous drive means, manual start and stop means for connecting said clutch means and simultaneously connecting said slow speed feed means of the feed works, automatic means adapted upon starting of the machine to disconnect said manual start and stop means from said feed works whereby the machine may be manually stopped and restarted without changing the feed works, automatic means for connecting said fast speed feed means of the feed works during the cycle of operation of the tool slide means, and automatic means adapted to be operated at the end of a single cycle of operation of said tool slide means for disconnecting said clutch means, said last means adapted to connect said manual start and stop means to the feed works.

8. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle, drive means for said spindle, continuous drive means, intermittent drive means for simultaneously driving said feed works and said spindle drive means, clutch means for connecting and disconnecting said intermittent drive means to said continuous drive means, manual means for connecting said clutch means, operating means for said clutch including a rotary member adapted to be moved in one or the other directions to connect and disconnect said clutch, manual means adapted by movement in one or the other directions to move said rotary member in clutch connecting and disconnecting direction, and automatic means adapted to be operated at the end of a single cycle of operation of said tool slide means to move said rotary members in clutch disconnecting direction.

9. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle, drive means for said spindle, continuous drive means, intermittent drive means for simultaneously driving said feed works and said spindle drive means, clutch means for connecting and disconnecting said intermittent drive means to said continuous drive means, manual means for connecting said clutch means, operating means for said clutch including a rotary member adapted to be moved in one or the other direction to connect and disconnect said clutch, manual means adapted by movement in one or the other directions to move said rotary member in clutch connecting and disconnecting direction, said manual means having an initial limited inoperative movement in clutch disconnecting direction to prevent accidental stopping of the machine, and automatic means adapted to be operated at the end of a single cycle of operation of said tool slide means to move said rotary members in clutch disconnecting direction.

10. In a machine tool of the character described, the combination of a base, a rotary work carrying spindle mounted in said base, a column extending upwardly from said base at one side of said spindle, tool slide means mounted on said column, feed work mounted at the upper end of said column operatively connected with said tool slide means to move said means into and out of relation with said spindle, drive means for said spindle, continuous drive means, intermittent drive means for simultaneously driving said feed works and said spindle drive means, clutch means for connecting and disconnecting said intermittent drive means to said continuous drive means, manual means for connecting said clutch means, operating means for said clutch including a lever connected to said clutch means and adapted upon movement in one or the other direction to connect and disconnect said clutch, spring pressed plunger means adapted upon movement of said lever past a fixed point to complete the movement of said lever to clutch connecting or disconnecting position, manual means adapted by movement in one or the other directions to move said lever in clutch connecting and disconnecting direction, and automatic means adapted to be operated at the end of a single cycle of operation of said tool slide means to move said lever in clutch disconnecting direction.

11. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle, drive means for said spindle, continuous drive means, intermittent drive means for simultaneously driving said feed works and said spindle drive means, clutch means for connecting and disconnecting said intermittent drive means to said continuous drive means, manual means for connecting said clutch means, operating means for said clutch including a shaft rotatably mounted in said column, means for manually rotating said shaft, clutch operating means carried by said shaft adapted upon manual rotation of said shaft in one or the other directions to connect and disconnect said clutch, and automatic means mounted on said shaft for relative rotation thereon adapted to be operated at the end of a single cycle of operation of said tool slide means for disconnecting said clutch means.

12. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle, drive means for said spindle, continuous drive means, intermittent drive means for simultaneously driving said feed works and said spindle drive means, clutch means for connecting and disconnecting said intermittent drive means to said continuous drive means, manual means for connecting said clutch means, operating means for said clutch including a shaft rotatably mounted in said column, means for manually rotating said shaft, clutch operating means mounted on said shaft for relative rotation thereon, means fixed to said shaft adapted upon rotation of said shaft in one or the other directions to impart rotation to said clutch operating means, in one or the other directions to respectively connect and disconnect said clutch, and automatic means adapted to be operated at the end of a single cycle of operation of said tool slide means for operating said clutch operating means in clutch disconnecting direction to stop the machine.

13. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle, drive means for said spindle, continuous drive means, intermittent drive means for simultaneously driving said feed works and said spindle drive means, clutch means for connecting and disconnecting said intermittent drive means to said continuous drive means, manual means for connecting said clutch means, operating means for said clutch including a shaft rotatably mounted in said column, means for yieldably retaining said shaft in a fixed position, means for manually rotating said shaft in opposed directions from said fixed position, clutch operating means mounted on said shaft for relative rotation thereon, means fixed to said shaft adapted upon rotation of said shaft in one or the other directions to impart rotation to said clutch operating means in one or the other directions to respectively connect and disconnect said clutch, and automatic means adapted to be operated at the end of a single cycle of operation of said tool slide means for operating said clutch operating means in clutch disconnecting direction to stop the machine.

14. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle, drive means for said spindle, continuous drive means, intermittent drive means for simultaneously driving said feed works and said spindle drive means, clutch means for connecting and disconnecting said intermittent drive means to said continuous drive means, manual means for connecting said clutch means, operating means for said clutch including a shaft rotatably mounted in said column, means for manually rotating said shaft, clutch operating means mounted on said shaft for relative rotation thereon, means fixed to said shaft adapted upon rotation of said shaft in one or the other directions to impart rotation to said clutch operating means in one or the other directions to respectively connect and disconnect said clutch, and automatic means mounted on said shaft for relative rotation thereon, adapted to be operated at the end of a single cycle of operation of said tool slide means for operating said clutch operating means in clutch disconnecting direction to stop the machine.

15. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle and including slow and fast speed feed means whereby the working feed of said tool slide means is relatively slow and the return feed is relatively fast, drive means for said spindle, continuous drive means, intermittent drive means for simultaneously driving said feed works and said spindle drive means, clutch means for connecting and disconnecting said intermittent drive means to said continuous drive means, operating means for said clutch including a shaft rotatably mounted in said column, means for manually rotating said shaft, clutch operating means fixed to said shaft adapted upon rotation of said shaft in one or the other directions to connect and disconnect said clutch, means fixed to said shaft adapted upon rotation of said shaft in clutch connecting direction to connect said slow speed feed means of the feed works, automatic means for connecting said fast speed feed means of the feed works during the cycle of operation of the tool slide means, and automatic means adapted to be operated at the end of a single cycle of operation of said tool slide means for disconnecting said clutch means.

16. In a machine tool of the character described, the combination of a base, a rotary work carrying spindle mounted in said base, a column extending upwardly from said base at one side of said spindle, tool slide means mounted on said column, feed works mounted at the upper end of said column operatively connected with said tool slide means to move said means into and out of relation with said spindle and including slow and fast speed feed means whereby the working feed of said tool slide means is relatively slow and the return feed is relatively fast, drive means for said spindle, continuous drive means, intermittent drive means for simultaneously driving said feed works and said spindle drive means, clutch means for connecting and disconnecting said intermittent drive means to said continuous drive means, operating means for said clutch including a shaft rotatably mounted in said column, means for manually rotating said shaft, clutch operating means fixed to said shaft adapted upon rotation of said shaft in one or the other direction to connect and disconnect said clutch, means fixed to said shaft adapted upon rotation of said shaft in clutch connecting direction to connect said slow speed feed means of the feed works, automatic means mounted on said shaft for relative rotation thereon adapted upon starting of the machine to disconnect said last means from the feed works whereby the machine may be manually stopped and re-started without changing the feed works, automatic means for connecting said fast speed feed means of the feed works during the cycle of operation of the tool slide means, and automatic means adapted to be operated at the end of a single cycle of operation of said tool slide means for disconnecting said clutch means to stop the machine.

17. In a machine tool of the character described, the combination of a base, a work carrier mounted on said base, a support on said base, tool slide means mounted on said support, feed works mounted on said support operatively connected with said tool slide means to move said means into and out of relation with said carrier, drive means for said carrier, drive means for driving said feed works and carrier drive comprising a continuously driven shaft, an intermittent drive shaft in axial alignment with said continuously driven shaft and operatively connected to said feed works and carrier drive for simultaneously driving them, clutch means for connecting and disconnecting said intermittent drive shaft and said continuously driven shaft, and means for operating said clutch.

18. In a machine tool of the character described, the combination of a base, a rotary work carrying spindle mounted in said base, a support on said base, tool slide means mounted on said support, feed work mounted on said support operatively connected with said tool slide means to move the said means into and out of relation with said spindle and including slow and fast speed means whereby the working feed of said tool slide means is relatively slow and the return feed is relatively fast, drive means for said spindle, continuous drive means, intermittent drive means for simultaneously driving said feed works and said spindle drive means, clutch means for connecting and disconnecting said intermittent drive means to said continuous drive means, means for connecting said clutch means and simultaneously connecting said slow speed feed means of the feed works, automatic means for connecting said fast speed feed means of the feed works during the cycle of operation of the tool slide means, and means for disconnecting the clutch.

Signed at Bridgeport, in the county of Fairfield and State of Connecticut, this third day of July, A. D. 1925.

EDWARD P. BULLARD, Jr.